United States Patent
Jung et al.

(10) Patent No.: US 9,871,447 B2
(45) Date of Patent: Jan. 16, 2018

(54) DC-DC CONVERTER

(71) Applicant: Industry-Academic Cooperation Foundation, Yonsei University, Seoul (KR)

(72) Inventors: Seongook Jung, Seoul (KR); Dong Hoon Jung, Seoul (KR); Hong Hyun Choi, Anyang-si (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 15/366,427

(22) Filed: Dec. 1, 2016

(65) Prior Publication Data

US 2017/0170729 A1    Jun. 15, 2017

(30) Foreign Application Priority Data

Dec. 10, 2015 (KR) .......................... 10-2015-0175941

(51) Int. Cl.
*G05F 1/565*    (2006.01)
*H02M 3/158*    (2006.01)

(52) U.S. Cl.
CPC .................................... *H02M 3/158* (2013.01)

(58) Field of Classification Search
CPC ................. H02M 3/1588; H02M 1/28; H02M 2001/0009; Y02B 70/1466
USPC ................................ 323/271–275, 282–288
See application file for complete search history.

(56) References Cited

U.S. PATENT DOCUMENTS

| | | | | |
|---|---|---|---|---|
| 6,815,936 | B2 * | 11/2004 | Wiktor | H02M 3/1588 323/282 |
| 7,482,793 | B2 * | 1/2009 | Stoichita | H02M 3/1563 323/271 |
| 7,768,245 | B1 * | 8/2010 | De Cremoux | H02M 3/156 323/225 |
| 9,240,720 | B2 * | 1/2016 | Tateishi | H02M 3/158 |
| 9,300,212 | B2 * | 3/2016 | Notman | H02M 3/1588 |
| 2012/0176822 | A1 | 7/2012 | Menegoli et al. | |
| 2013/0015829 | A1 | 1/2013 | Menegoli et al. | |
| 2013/0038310 | A1 | 2/2013 | Menegoli et al. | |

FOREIGN PATENT DOCUMENTS

| | | |
|---|---|---|
| JP | 2011-193674 A | 9/2011 |
| KR | 2012-0108898 A | 10/2012 |
| KR | 2014-0066598 A | 6/2014 |

OTHER PUBLICATIONS

Chuang, C.J. and H.P. Chou. "An Efficient Fast Response Hysteresis Buck Converter with Adaptive Synthetic Ripple Modulator." 8th International Conference on Power Electronics, ECCE Asia, IEEE (2011): 620-627.

* cited by examiner

*Primary Examiner* — Rajnikant Patel
(74) *Attorney, Agent, or Firm* — Harness, Dickey & Pierce, P.L.C.

(57) ABSTRACT

Provided is a DC-DC converter implemented in a small area with a fast transient response. The DC-DC converter includes: a power supply unit configured to supply an input voltage; an inductor connected between an output terminal where an output voltage is outputted and the power supply unit; an emulator connected to both ends of the inductor to generate a feedback voltage; and a control circuit configured to control the power supply unit through a time domain control based on the output voltage and the feedback voltage.

12 Claims, 12 Drawing Sheets

| PD_OUT1 | PD_OUT2 | PWM_OUT |
|---|---|---|
| 0 | 0 | DN |
| 0 | 1 | Prev State |
| 1 | 0 | UP* |
| 1 | 1 | UP |

DC-DC CONVERTER

CROSS-REFERENCE TO RELATED APPLICATIONS

This U.S. non-provisional patent application claims priority under 35 U.S.C. §119 of Korean Patent Application No. 10-2015-0175941, filed on Dec. 10, 2015, the entire contents of which are hereby incorporated by reference.

BACKGROUND

The present disclosure relates to a DC-DC converter.

A switching regulator is a device for converting energy by using an energy storage device such as an inductor or a capacitor. A DC-DC converter provides an appropriate feedback to such a switching regulator, thereby reducing or boosting an input DC voltage to output a desired DC voltage.

An exemplary DC-DC converter includes an inductor and operates as reciprocating between a phase for storing energy in the inductor and a phase for discharging the energy to a capacitor load. At this point, depending on whether a current flowing through the inductor drops to zero during a reciprocating cycle, the reciprocating cycle is divided into a continuous current mode (CCM) in which no current drops to zero and a discontinuous current mode (DCM) in which the current drops below zero in a section.

SUMMARY

The present disclosure provides a DC-DC converter implemented in a small area with a fast transient response.

The present disclosure also provides a DC-DC converter implemented to easily operate in a discontinuous current mode.

An embodiment of the inventive concept provides a DC-DC converter including: a power supply unit configured to supply an input voltage; an inductor connected between an output terminal where an output voltage is outputted and the power supply unit; an emulator connected to both ends of the inductor to generate a feedback voltage; and a control circuit configured to control the power supply unit through a time domain control based on the output voltage and the feedback voltage.

In an embodiment, the power supply unit may supply an input voltage and adjust a pulse width of the input voltage according to a pulse width modulation signal, and the pulse width modulation signal may be generated based on the output voltage and the feedback voltage by the control circuit.

In an embodiment, the control circuit may include an error correction circuit configured to amplify an error between the output voltage and a predetermined reference voltage; and a feed forward circuit configured to feed-forward-control the power supply unit based on the feedback voltage, the reference voltage, and the error amplified by the error correction circuit.

In an embodiment, the error correction circuit may include: an output voltage controlled delay line configured to delay an inputted reference clock signal based on the output voltage; a reference voltage controlled delay line configured to delay an inputted reference clock signal based on the reference voltage; and a time zone amplifier configured to receive outputs of the output voltage controlled delay line and the reference voltage controlled delay line.

In an embodiment, the feed forward circuit may include a voltage controlled delay line configured to delay a signal amplified by the time zone amplifier based on the feedback voltage and the reference voltage.

In an embodiment, the control circuit may include a signal generation unit configured to generate the pulse width modulation signal based on an output of the feed forward circuit.

In an embodiment, the feedback voltage may have the same start time point and end time point as a current and a ripple flowing through the inductor, and the emulator may further include a discontinuous current mode detection unit configured to detect a time point at which the current flowing through the inductor becomes zero based on the feedback voltage.

In an embodiment, the discontinuous current mode detection unit may include: a discontinuous current mode detection node capacitively-coupled to a node where the feedback voltage is outputted; and a transistor connected between the discontinuous current mode detection node and a ground node.

In an embodiment of the inventive concept, a DC-DC converter includes: a power supply unit configured to supply an input voltage and adjust a pulse width of the input voltage according to a pulse width modulation signal; an inductor connected between an output terminal where an output voltage is outputted and the power supply unit; an emulator connected in parallel to the inductor to generate a feedback voltage having the same start time point and end time point as a current and a ripple flowing through the inductor and a discontinuous current mode detection voltage; and a control circuit configured to generate a control signal including the pulse width modulation signal through a time domain control based on the output voltage and the discontinuous current mode detection voltage, wherein the emulator includes a resistor and a first capacitor connected in series and a second capacitor connected to a feedback voltage node between the resistor; and the first capacitor, and the feedback voltage is outputted from the feedback voltage node and the discontinuous current mode detection voltage is outputted from the feedback voltage node and a discontinuous current mode detection node capacitively-coupled to the second capacitor.

In an embodiment, the emulator may further include a first transistor connected between the discontinuous current mode detection node and a ground node; and the first transistor may discharge the discontinuous current mode detection node by a ground voltage in each predetermined period.

In an embodiment, the control circuit may include: a first voltage controlled delay line configured to delay an inputted reference clock signal based on the output voltage; a second voltage controlled delay line configured to delay the reference clock signal based on a predetermined reference voltage; and a comparator configured to receive outputs of the first and second voltage controlled delay lines, perform a phase comparison by including a phase detector, and generate the control signal according to a comparison result.

In an embodiment, The DC-DC converter may further include a second transistor connected in parallel to the inductor, wherein the control circuit may further include a discontinuous current mode control circuit, and as it is detected through the emulator that a current flowing through the inductor becomes zero, the discontinuous current mode control circuit may generate a clock signal for controlling the second transistor to prevent a ringing of the current flowing through the inductor.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Other advantages and features of the inventive concept, and implementation methods thereof will be clarified through following embodiments described with reference to the accompanying drawings. However, the inventive concept is not limited to embodiments disclosed below and is only defined by the appended claims. Although not defined, all the terms used herein (including technical or scientific terms) have the same meaning as those accepted by common techniques in the conventional techniques that this inventive concept belongs. General descriptions of known configurations may be omitted in order not to obscure the subject matter of the inventive concept. The same reference numerals are used as much as possible with respect to the same or corresponding configuration in the drawings of the inventive concept.

Terms used in this specification are used to describe specific embodiments, and are not intended to limit the scope of the inventive concept. The singular forms 'a,' 'an,' and 'the' include plural reference unless the context clearly dictates otherwise. Additionally, in various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components. The meaning that a component is "connected" to another component in the specification includes that the component is directly connected to the other component or indirectly connected by using the other component as a medium.

A DC-DC converter according to an embodiment of the inventive concept may use an emulator connected to the both ends of an inductor in order for an equivalent series resistor (ESR) connected in series to a capacitor of an output terminal to operate in a low state. Additionally, the emulator may detect a time point at which a current flowing through an inductor becomes zero in order to support an operation of a discontinuous current mode in a low load current. A DC-DC converter according to an embodiment of the inventive concept may reduce a design complexity and an implementation area by using a time domain control method.

Figure 1:
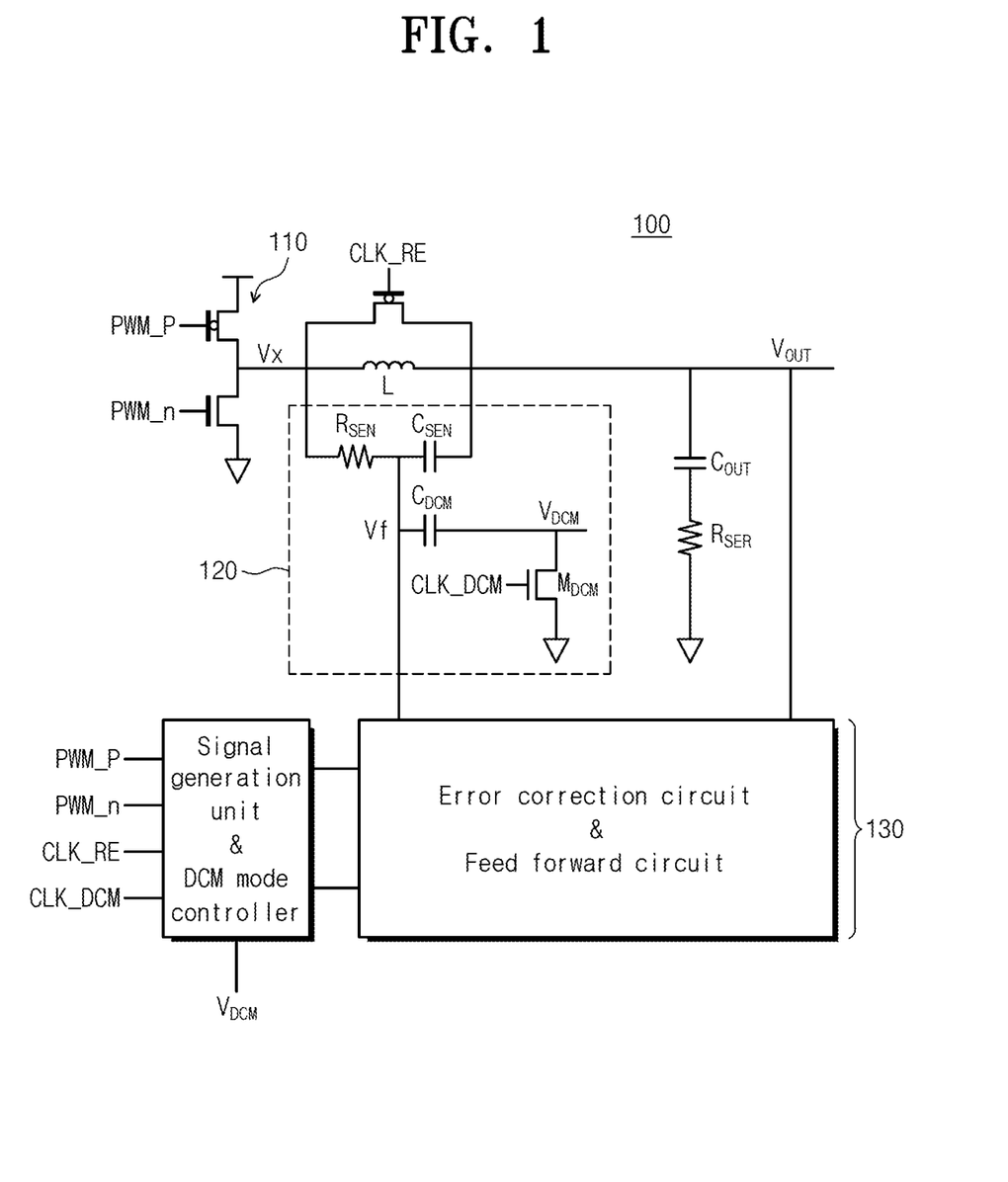
FIG. 1 is a view illustrating a DC-DC converter according to an embodiment of the inventive concept.

FIG. 1 is a view illustrating a DC-DC converter according to an embodiment of the inventive concept.

Referring to FIG. 1, a DC-DC converter 100 according to an embodiment of the inventive concept may include a power supply unit 110, an inductor L, an emulator 120, and a control circuit 130.

The power supply unit 110 supplies an input voltage and a DC voltage. The power supply unit 110 may adjust the size Vx of an input voltage supplied to the inductor L according to pulse width modulation signals PWM_P and PWM_N.

The inductor L may be connected between an output terminal for outputting an output voltage Vout and the power supply unit 110. The inductor L is not limited thereto and may be replaced with another component for charging and discharging energy.

The emulator 120 may be connected to both ends of the inductor L. In detail, the emulator 120 may be connected in parallel to the inductor L and generate a feedback voltage $V_F$ that is proportional to a current $I_L$ and a ripple flowing through the inductor L. That is, the feedback voltage $V_F$ may have the same start time point and end time point as the inductor current $I_L$ and the ripple.

Referring to FIG. 1, the emulator 120 may include a discontinuous current mode detection unit including a resistor $R_{SEN}$ and a first capacitor $C_{SEN}$, which are connected in series to each other, and a second capacitor $C_{DCM}$ connected to a node of a feedback voltage $V_F$ between the resistor $R_{SEN}$ and the first capacitor $C_{SEN}$. The feedback voltage $V_F$ is outputted from the node of the feedback voltage $V_F$. However, since it does not detect by using the feedback voltage $V_F$ that a current flowing through the inductor L becomes zero, a capacitively-coupled discontinuous current mode detection node detects a discontinuous current mode detection voltage $V_{DCM}$ through the second capacitor $C_{DCM}$ and through this, it detects that a current flowing through the inductor L becomes zero (zero current detection). The emulator 120 may further include a first transistor $M_{DCM}$ connected between a discontinuous current mode detection node and a ground node. The first transistor $M_{DCM}$ may receive a clock signal CLK_DCM through a gate terminal and accordingly, discharge a discontinuous current mode detection node by a ground voltage in each predetermined period.

Figure 2:
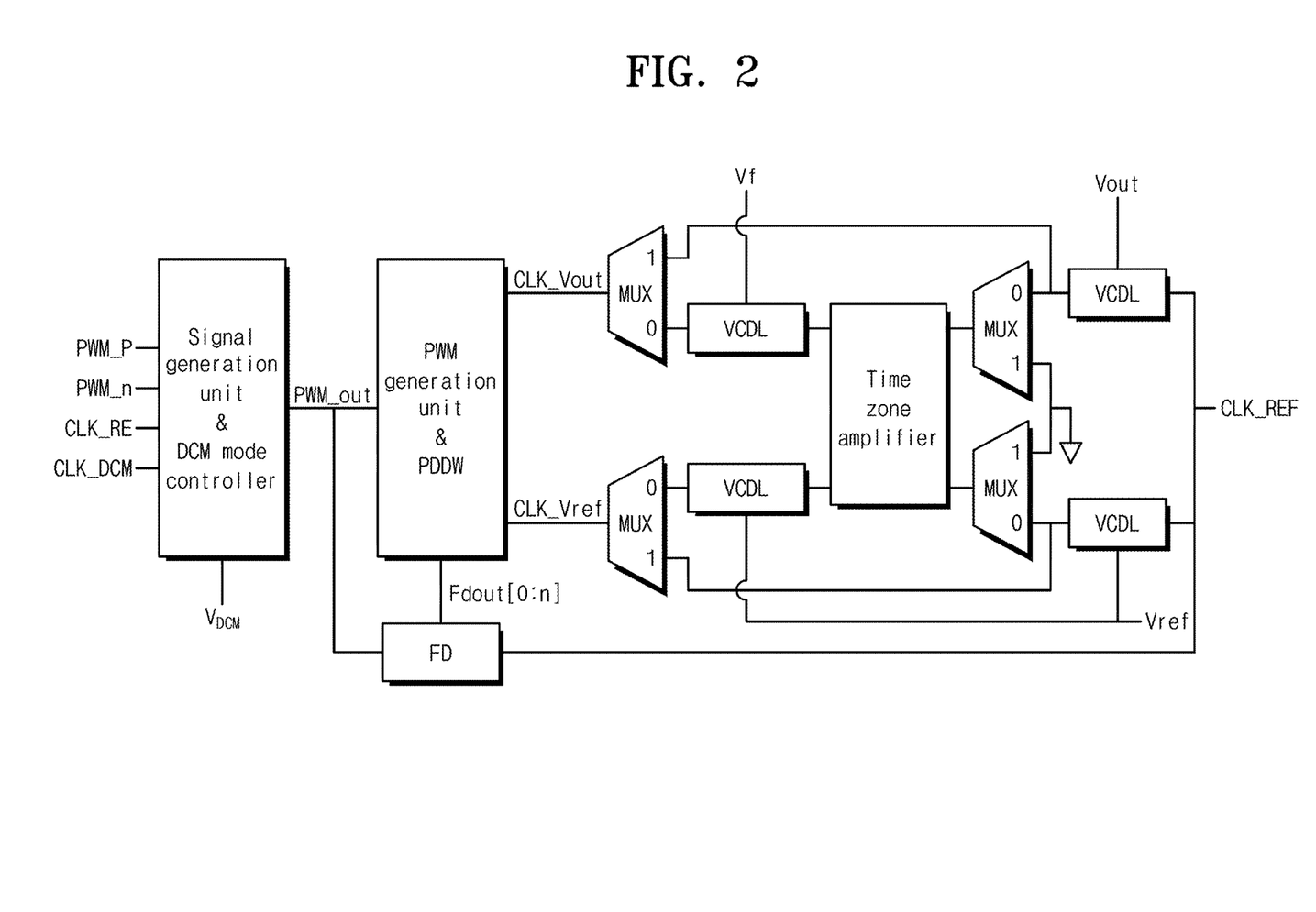
FIG. 2 is a view illustrating a control circuit in a DC-DC converter according to an embodiment of the inventive concept.
Figure 3:
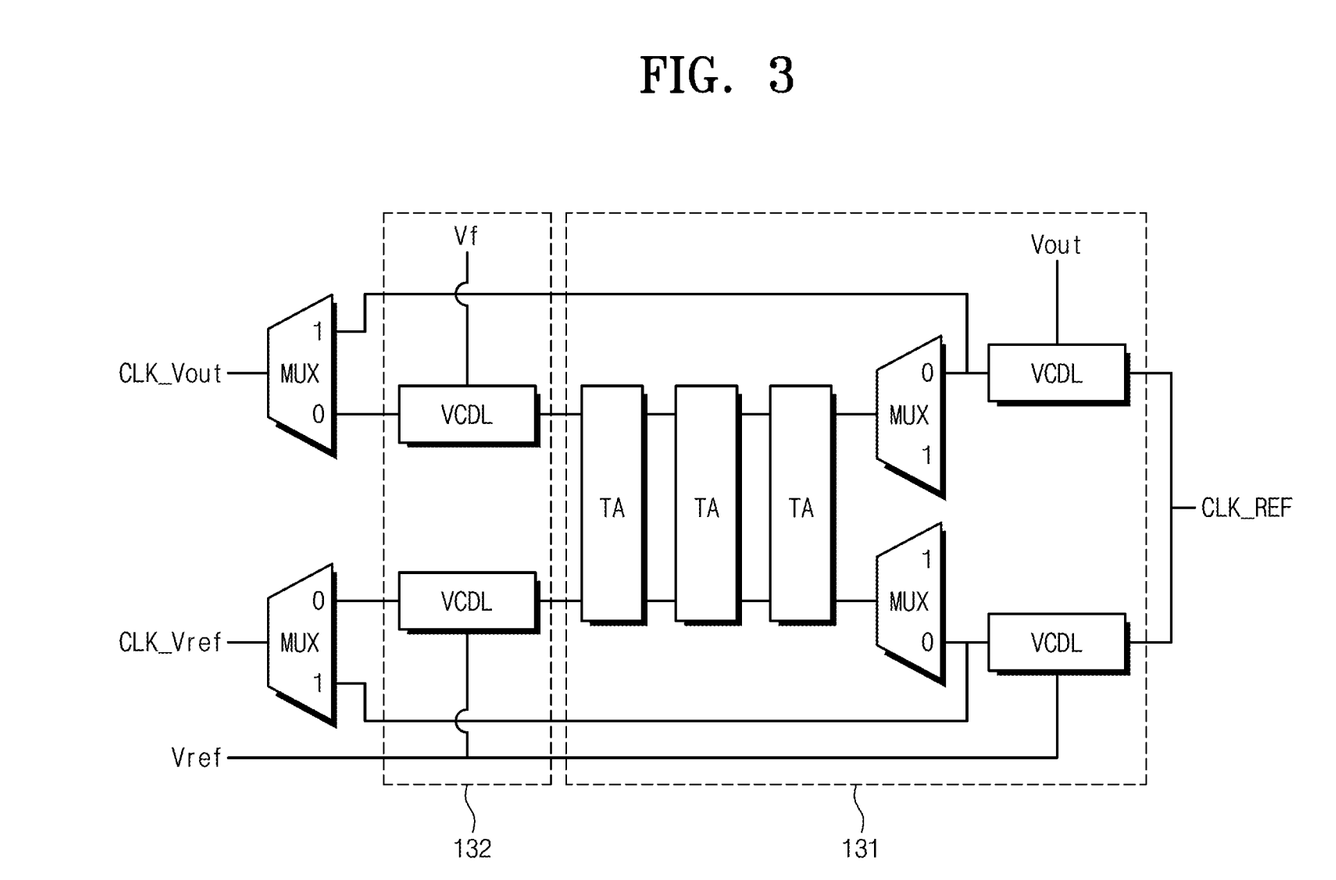
FIG. 3 is a view illustrating a partial configuration of a control circuit in detail.

FIG. 2 is a view illustrating the control circuit 130 in a DC-DC converter according to an embodiment of the inventive concept. FIG. 3 is a view illustrating a configuration of the control circuit 130 in detail according to an embodiment of the inventive concept.

Referring to FIGS. 1 to 3, the control circuit 130 includes an error correction circuit 131 and a feed forward circuit 132. The error correction circuit 131 may amplify an error between an output voltage Vout and a predetermined reference voltage $V_{REF}$ and the feed forward circuit 132 may feed-forward-control the power supply unit 110 based on the reference voltage $V_{REF}$, the feedback voltage $V_F$, and the error amplified by the error correction circuit 131.

Referring to FIG. 3, the error correction circuit 131 may include two voltage controlled delay lines VCDL for delaying each inputted reference clock signal CLK_REF based on the output voltage Vout and the reference voltage $V_{REF}$ and a time zone amplifier for receiving and amplifying the outputs of the two voltage controlled delay lines VCDL. Additionally, referring to FIG. 3, the feed forward circuit 132 may include a voltage controlled delay line for delaying a signal amplified by the time zone amplifier based on the feedback voltage $V_F$ and the reference voltage $V_{REF}$.

Figure 4:
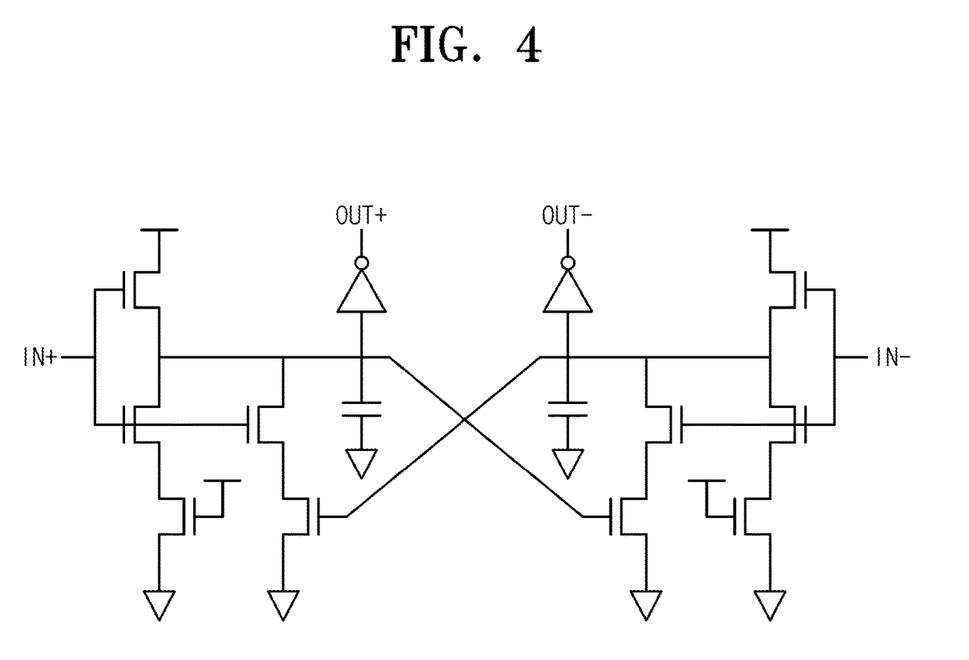
FIG. 4 is a view illustrating a time zone amplifier used in a DC-DC converter according to an embodiment of the inventive concept.

A time zone amplifier used in a DC-DC converter according to an embodiment of the inventive concept is shown in FIG. 4. As shown in FIG. 4, a time zone amplifier according to an embodiment of the inventive concept may include a capacitor for increasing a gain.

Figure 5:
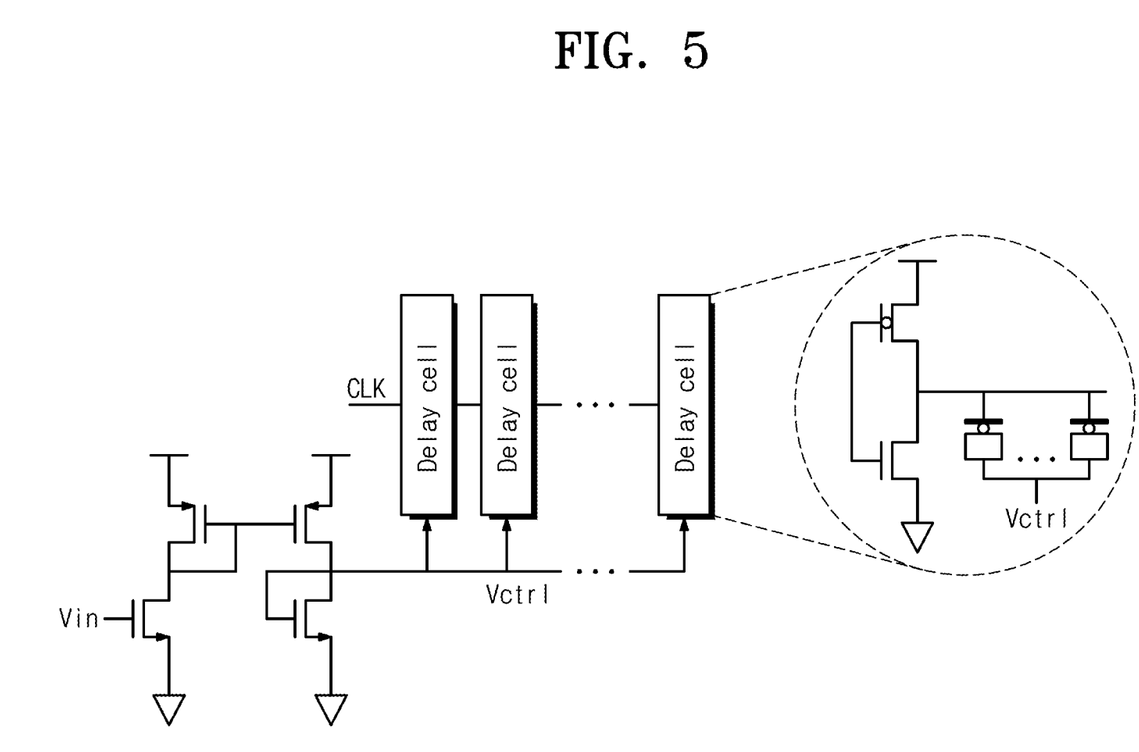
FIG. 5 is a view illustrating a voltage controlled delay line used in a DC-DC converter according to an embodiment of the inventive concept.

A voltage controlled delay line used in a DC-DC converter according to an embodiment of the inventive concept is shown in FIG. 5. The voltage controlled delay line may adjust a delay by using a MOS capacitor element. A voltage controlled delay line according to an embodiment of the inventive concept may use a method for adjusting a MOS capacitor element connected to an output terminal instead of a method for controlling a gate or drain of a transistor element. Due to this, only an element connected to an output terminal may have a thick oxide layer and accordingly, an operation may be possible without using a high supply voltage in a control logic or using a level shifter for voltage level switching. Additionally, a supply voltage of a delay line may be lowered. Accordingly, power consumption for obtaining the same delay gain may be lowered.

Figure 6:
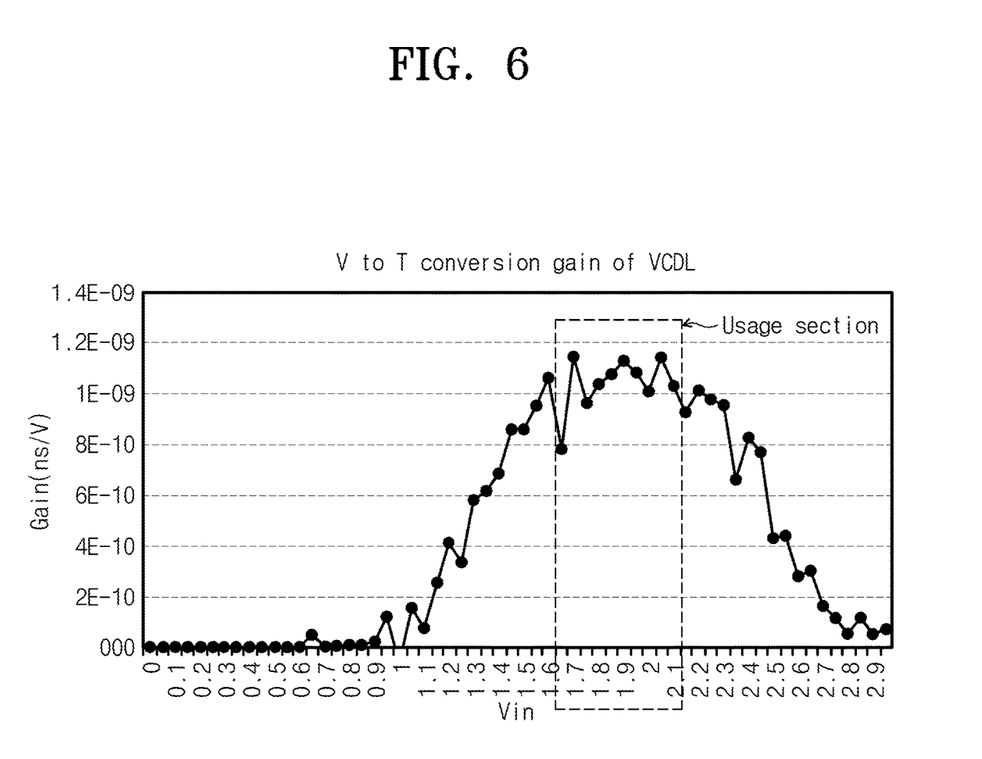
FIG. 6 is a graph illustrating a gain per input voltage of a voltage controlled delay line shown in FIG. 5.

FIG. 6 is a graph illustrating a gain per input voltage of a voltage controlled delay line shown in FIG. 5. Referring to FIG. 6, it is checked that a gain is changed according to an inputted voltage in the voltage controlled delay line. According to an embodiment of the inventive concept, a voltage section representing a predetermined gain may be used as a usage section in a DC-DC converter.

FIGS. 7 to 10 are views illustrating an operation of a signal generation unit used in a DC-DC converter according to an embodiment of the inventive concept.

In relation to a DC-DC converter according to an embodiment of the inventive concept, a control circuit may include a signal generation unit for receiving an output of a feed forward circuit, performing a phase comparison by including a phase detector, and generating a control signal according to a comparison result. Additionally, referring to FIG. 1, a DC-DC converter may further include a second transistor connected in parallel to an inductor. As a discontinuous current mode detection unit detects that a current flowing through an inductor becomes zero, a clock signal CLK_RE for controlling the second transistor may be controlled to prevent the ringing of an inductor current.

Figure 7:
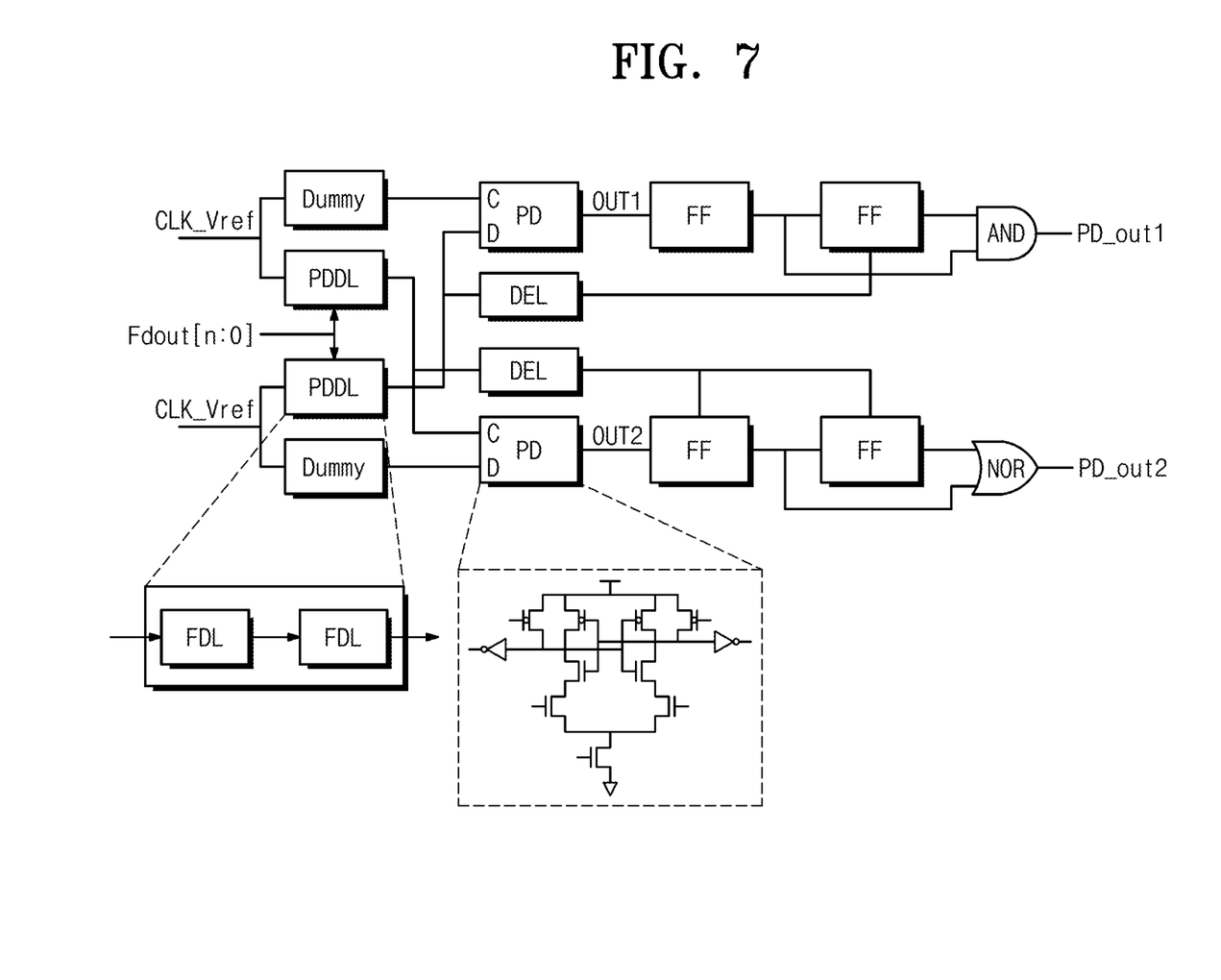
FIGS. 7 to 10 are views illustrating an operation of a signal generation unit used in a DC-DC converter according to an embodiment of the inventive concept.

Referring to FIG. 7, a DC-DC converter according to an embodiment of the inventive concept may implement a comparator by using a phase detector PD with a detection window. Due to this, an output voltage may maintain a predetermined frequency. According to an embodiment of the inventive concept, unlike a conventional analog type comparator, a detection window may be adjusted more easily by using a digital control method. Initial values of a bit controlled in the detection window may be set to an intermediate value other than zero or a maximum value.

Figure 8:
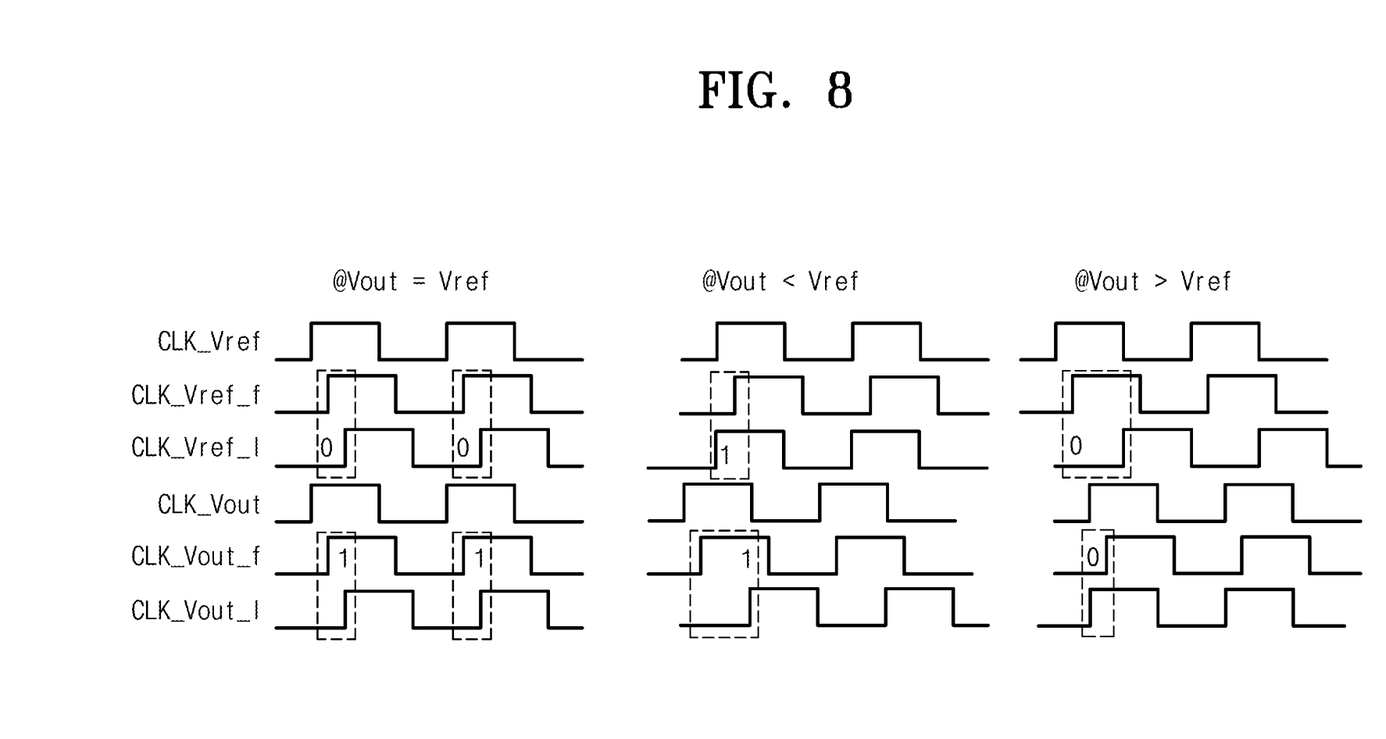
Figure 9:
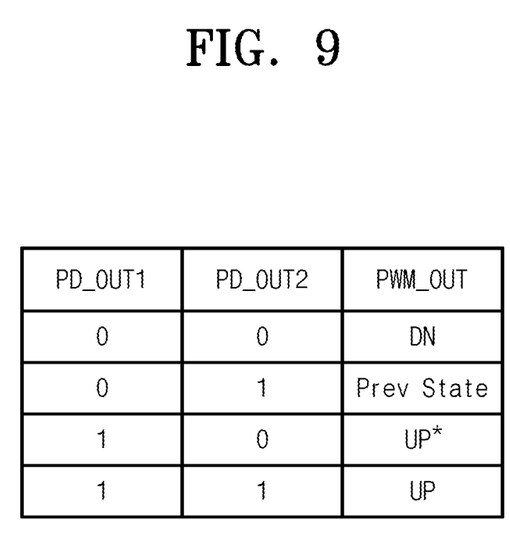

FIG. 8 is a view illustrating clock signals generated according to a result obtained by comparing an output signal and a reference signal. FIG. 9 is a view illustrating a pulse width modulation signal PWM_OUT generated according to signals PD_OUT1 and PD_OUT2 outputted from a comparator shown in FIG. 7.

Figure 10:
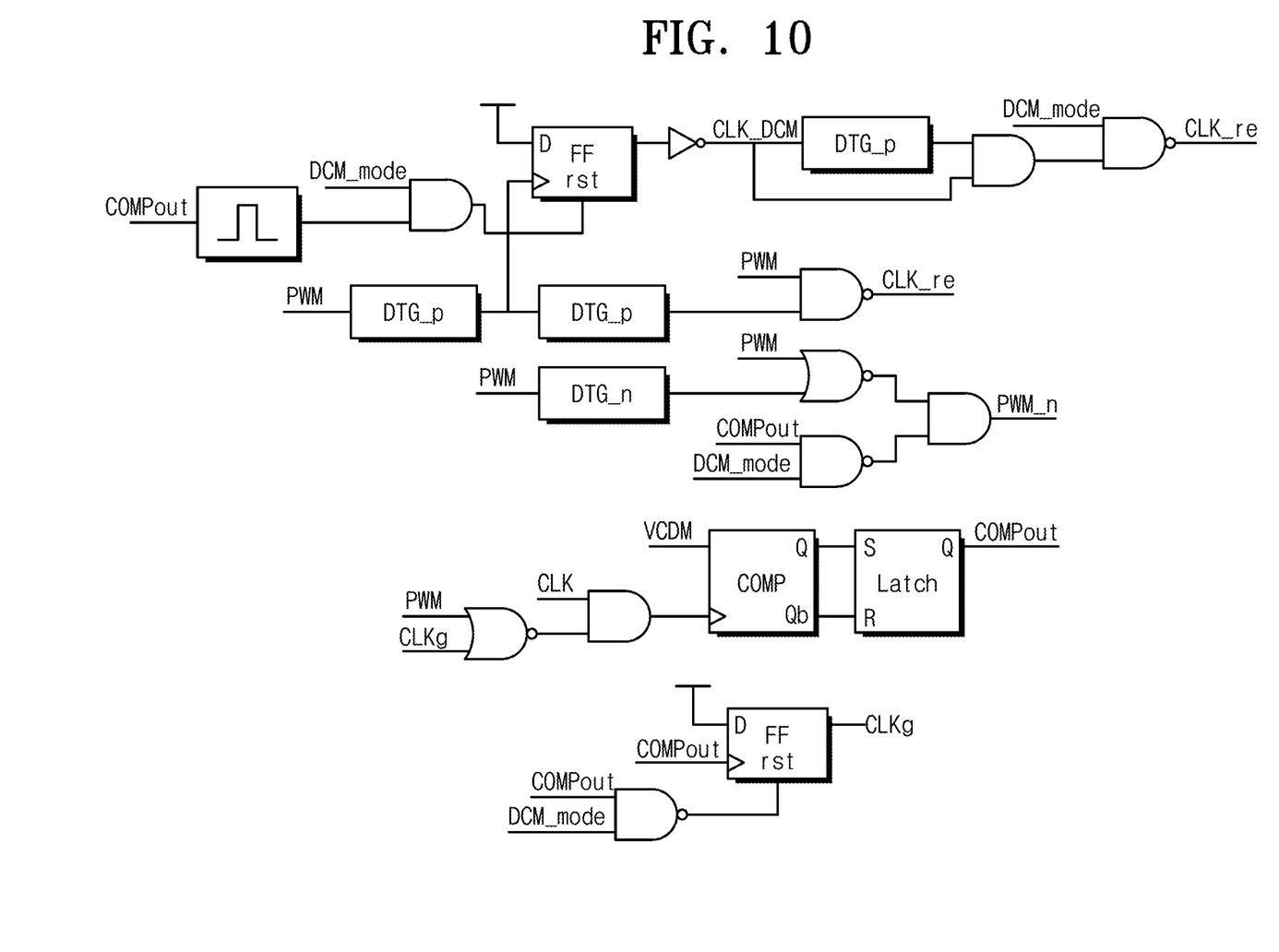
Figure 11:
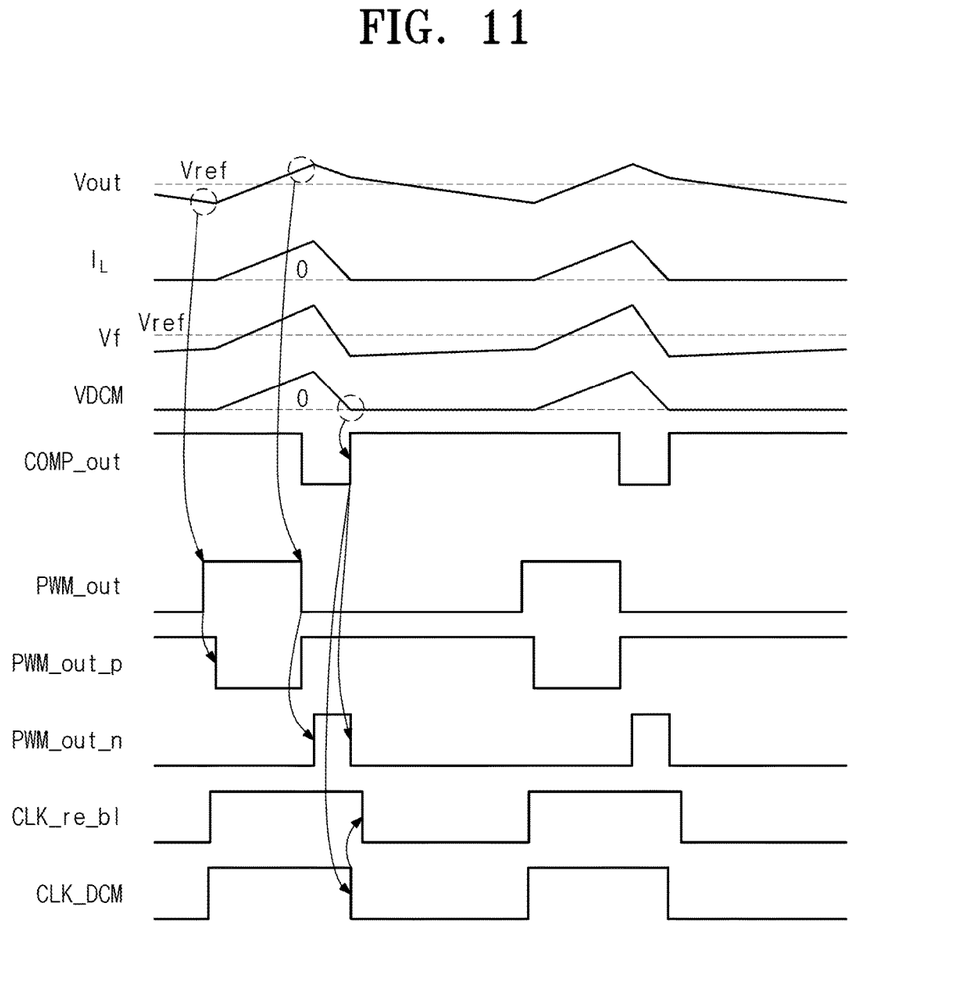
FIG. 11 is a view illustrating changes in each node voltage and inductor current of a DC-DC converter and signals generated by a signal generation unit are shown according to an embodiment of the inventive concept.

FIG. 10 is a view illustrating a signal generation unit for generating a control signal according to a pulse width modulation signal PWM_OUT generated by a comparator shown in FIG. 7 and a signal COMPout generated by a discontinuous current mode detection unit. In a discontinuous current mode, a signal DCM_mode is maintained in a high level. In a continuous current mode, the signal DCM_mode is maintained in a low level. Additionally, since an inductor current does not become zero in the continuous current mode, the second transistor MRE is turned off always and a clock signal CLK_RE for controlling this is maintained in a high level. Additionally, since a discontinuous current mode detection is unnecessary in the continuous current mode, a discontinuous current mode detection node should be grounded in order to prevent capacitive coupling. Accordingly, a clock signal CLK_DCM for controlling the first transistor MDCM may be maintained in a high level. Referring to FIG. 11, changes in each node voltage and inductor current of a DC-DC converter and signals generated by a signal generation unit are shown according to an embodiment of the inventive concept.

Figure 12:
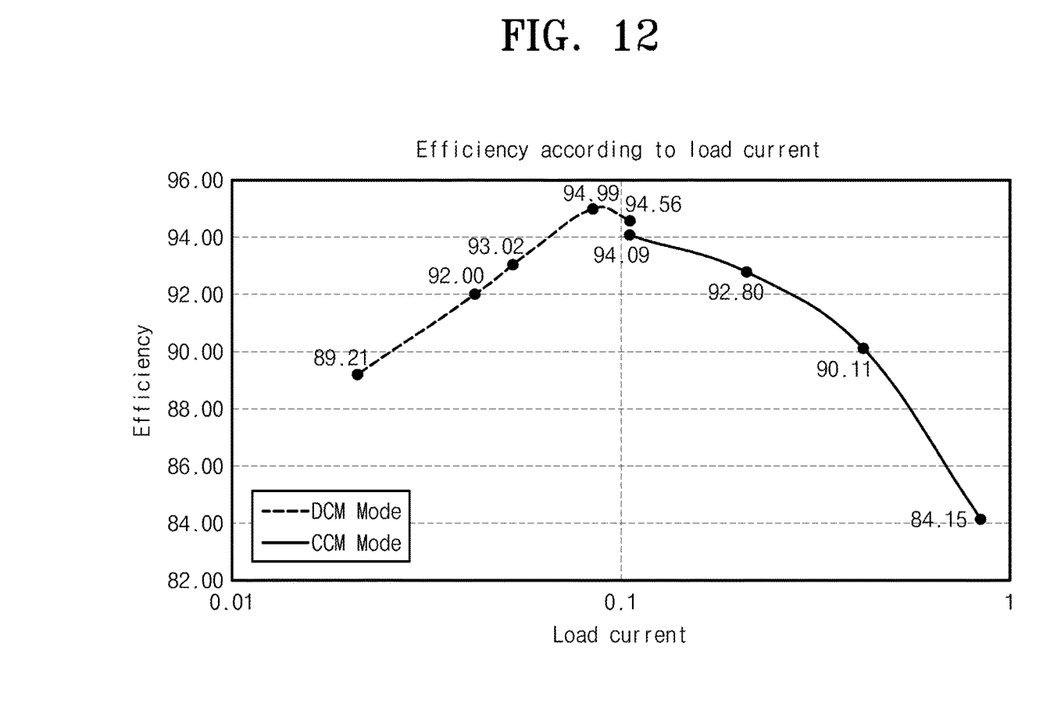
FIG. 12 is a graph illustrating an efficiency depending on a current flowing through a load connected to an output terminal of a DC-DC converter according to an embodiment of the inventive concept.

FIG. 12 is a graph illustrating an efficiency depending on a current flowing through a load connected to an output terminal of a DC-DC converter according to an embodiment of the inventive concept. Referring to FIG. 12, it is checked that operation efficiency is maintained high during an operation in a discontinuous current mode while a load current is in a low state.

A DC-DC converter according to an embodiment of the inventive concept may be implemented in a small area with a fast transient response.

Additionally, a DC-DC converter according to an embodiment of the inventive concept may operate easily in a discontinuous current mode.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A DC-DC converter comprising:
   a power supply unit configured to supply an input voltage;
   an inductor connected between an output terminal where an output voltage is outputted and the power supply unit;
   an emulator connected to both ends of the inductor to generate a feedback voltage; and
   a control circuit configured to control the power supply unit through a time domain control based on the output voltage and the feedback voltage.

2. The DC-DC converter of claim 1, wherein the power supply unit supplies an input voltage and adjusts a pulse width of the input voltage according to a pulse width modulation signal, and the pulse width modulation signal is generated based on the output voltage and the feedback voltage by the control circuit.

3. The DC-DC converter of claim 2, wherein the control circuit comprises an error correction circuit configured to amplify an error between the output voltage and a predetermined reference voltage; and a feed forward circuit configured to feed-forward-control the power supply unit based on the feedback voltage, the reference voltage, and the error amplified by the error correction circuit.

4. The DC-DC converter of claim 3, wherein the error correction circuit comprises:
an output voltage controlled delay line configured to delay an inputted reference clock signal based on the output voltage;
a reference voltage controlled delay line configured to delay an inputted reference clock signal based on the reference voltage; and
a time zone amplifier configured to receive outputs of the output voltage controlled delay line and the reference voltage controlled delay line.

5. The DC-DC converter of claim 4, wherein the feed forward circuit comprises a voltage controlled delay line configured to delay a signal amplified by the time zone amplifier based on the feedback voltage and the reference voltage.

6. The DC-DC converter of claim 5, wherein the control circuit comprises a signal generation unit configured to generate the pulse width modulation signal based on an output of the feed forward circuit.

7. The DC-DC converter of claim 1, wherein the feedback voltage has the same start time point and end time points as a current and a ripple flowing through the inductor, and the emulator further comprises a discontinuous current mode detection unit configured to detect a time point at which the current flowing through the inductor becomes zero based on the feedback voltage.

8. The DC-DC converter of claim 7, wherein the discontinuous current mode detection unit comprises:
a discontinuous current mode detection node capacitively-coupled to a node where the feedback voltage is outputted; and
a transistor connected between the discontinuous current mode detection node and a ground node.

9. A DC-DC converter comprising:
a power supply unit configured to supply an input voltage and adjust a pulse width of the input voltage according to a pulse width modulation signal;
an inductor connected between an output terminal where an output voltage is outputted and the power supply unit;
an emulator connected in parallel to the inductor to generate a feedback voltage having the same start time point and end time point as a current and a ripple flowing through the inductor and a discontinuous current mode detection voltage; and
a control circuit configured to generate a control signal including the pulse width modulation signal through a time domain control based on the output voltage and the discontinuous current mode detection voltage,
wherein the emulator comprises a resistor and a first capacitor connected in series and a second capacitor connected to a feedback voltage node between the resistor; and
the first capacitor, and the feedback voltage is outputted from the feedback voltage node and the discontinuous current mode detection voltage is outputted from the feedback voltage node and a discontinuous current mode detection node capacitively-coupled to the second capacitor.

10. The DC-DC converter of claim 9, wherein the emulator further comprises a first transistor connected between the discontinuous current mode detection node and a ground node; and
the first transistor discharges the discontinuous current mode detection node by a ground voltage in each predetermined period.

11. The DC-DC converter of claim 9, wherein the control circuit comprises:
a first voltage controlled delay line configured to delay an inputted reference clock signal based on the output voltage;
a second voltage controlled delay line configured to delay the reference clock signal based on a predetermined reference voltage; and
a comparator configured to receive outputs of the first and second voltage controlled delay lines, perform a phase comparison by including a phase detector, and generate the control signal according to a comparison result.

12. The DC-DC converter of claim 11, further comprising a second transistor connected in parallel to the inductor,
wherein the control circuit further comprises a discontinuous current mode control circuit, and as it is detected through the emulator that a current flowing through the inductor becomes zero, the discontinuous current mode control circuit generates a clock signal for controlling the second transistor to prevent a ringing of the current flowing through the inductor.

* * * * *